(12) United States Patent
Battles et al.

(10) Patent No.: US 6,437,811 B1
(45) Date of Patent: Aug. 20, 2002

(54) USER INTERFACE FOR SORTING PHOTOGRAPHS ON A DIGITAL CAMERA

(75) Inventors: Amy E Battles, Greeley; K. Douglas Gennetten, Collins, both of CO (US)

(73) Assignee: Hewlett-Packard Company, Palo Alto ( * ) Notice: Subject to any disclaimer, the term of this patent is extended or adjusted under 35 U.S.C. 154(b) by 0 days.

(21) Appl. No.: 09/491,515

(22) Filed: Jan. 26, 2000

(51) Int. Cl.$^7$ .................................................. G09G 5/00
(52) U.S. Cl. ..................... 345/835; 345/840; 345/845; 348/323; 348/333.05; 396/291
(58) Field of Search ................... 345/810, 822, 345/824, 840, 845, 802, 835; 348/207, 232, 239, 333, 333.05, 338, 351; 386/104, 105, 106, 107, 108, 95–99, 117; 396/312, 373, 429, 291

(56) References Cited

U.S. PATENT DOCUMENTS

| | | | | |
|---|---|---|---|---|
| 5,796,945 A | * | 8/1998 | Tarabella | 709/219 |
| 5,898,434 A | * | 4/1999 | Small | 345/835 |
| 5,966,122 A | * | 10/1999 | Itoh | 345/723 |
| 6,128,037 A | * | 10/2000 | Anderson | 348/232 |
| 6,249,316 B1 | * | 6/2001 | Anderson | 348/333.05 |

* cited by examiner

*Primary Examiner*—Ba Huynh (57) ABSTRACT

A user interface for viewing and sorting photos at one time from a single common screen. The sorting operations includes such processes as deleting, locking, grouping, printing, and rotating the photographs or other data files such as tables. A user can (1) view from a single screen the photographs stored, (2) select the desired operations to perform on each photograph, and then (3) photograph by photograph view a display of selections made. Viewing and selecting desired operations from a single screen, eliminates unnecessary steps. In representative embodiments, a user of a digital camera or other imaging device can easily and conveniently perform these actions by selecting and activating a desired menu listed function using one or two thumbs while at the same time holding the camera.

11 Claims, 6 Drawing Sheets

USER INTERFACE FOR SORTING PHOTOGRAPHS ON A DIGITAL CAMERA

FIELD OF THE INVENTION

The present invention relates generally to digital cameras and more particularly to user interfaces for digital cameras used to control the camera function.

BACKGROUND OF THE INVENTION

Most digital cameras currently on the market employ a very tedious process for sorting through the photographs stored on them. The word "sorting" as used herein means "to separate from others" and includes such processes as deleting, locking, grouping, printing, and rotating the photographs. Cameras such as the Hewlett-Packard C20 and the Olympus D320L require the user to go to a menu picture by picture and select "delete" or "lock" functions. This process is very time consuming and frustrating to most users, because they can neither select a group of pictures on which they want to perform a common operation, e.g., delete photos 1, 2, 5, and 12, nor can they select a group of operations to perform on a single photo, e.g., rotate and lock photo number 3.

An improvement to the method described above has recently been introduced by FlashPoint Technology Incorporated in their Digita operating system on the Kodak DC260 and Minolta EX Zoom 1500. Digita allows a user to select or mark a number of photos and then go to the menu and select an operation to perform on all the marked photos. While better than previous methods, this method still has two distinct disadvantages: (1) once in the menu, the user can no longer view the marked photos and (2) the user can not select a group of operations to perform on a single photo.

The storage space available for photographs on digital cameras is expected to dramatically increase in the near future, and it is anticipated that the number of sorting/editing operations which can be performed on a digital camera will also increase. As such, there is a pressing need for an improved, simple digital camera interface that will permit the faster sorting/editing of the stored photographs.

SUMMARY OF THE INVENTION

In representative embodiments, the present patent document discloses means for viewing and sorting photos at one time from a single screen. A user can (1) view from a single screen the photographs stored, (2) select the desired editing operations to perform on each photograph, and (3) photograph by photograph view a display of the photo and the selections made. Performing these actions from a single screen eliminates unnecessary steps. In representative embodiments, a user of a digital camera can easily and conveniently perform these actions by selecting and activating a desired menu listed function using only one or two thumbs while at the same time holding the camera.

In a representative embodiment, after taking a series of pictures, the user selects a "Sort" mode or screen by either selecting from choices on a dedicated mode dial or from within a view menu. This sort screen displays thumbnails of the pictures taken along the left-hand side of the color LCD screen. Across the top of the screen are icons or text representing the available operations (delete, lock, rotate, etc.). The remainder of the screen is a matrix of check boxes lining up in rows with each photo and in columns with each operation. Using 4-direction navigation and an "ok" button, the user can quickly scroll though the pictures and navigate through the matrix. To perform an operation on any one of the photos, the user simply highlights the check box associated with the desired photo and operation and "checks" it by pressing the "ok" button. Scrolling to the very top reveals an "ALL PHOTOS" picture. Checking any box in this row performs the operation on all the pictures in the camera. If the user wants to zoom in on any of the pictures to view more detail before deciding how to operate on it, he simply highlights the desired photo and presses the "ok" button. The picture is then displayed full screen. All check boxes for the photo are available in the top right corner of the display by pressing the right arrow. From here, the user can navigate through the matrix in the same way as in the zoomed out view—up/down to scroll through pictures, left/right to scroll through operations, and "ok" to select an operation.

A primary advantage of the embodiments as described in the present patent document over prior methods is that the user can view and sort images at one time from a common screen providing the user the advantages of clearly observing which images will have which operations performed on them and the user can select any combination of images and operations from a single screen, thereby eliminating unnecessary steps.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

As shown in the drawings for purposes of illustration, the present patent document discloses in representative embodiments means for viewing and sorting photos at one time from a single screen. In a representative embodiment, a user can (1) view from a single screen the photographs stored, (2) select the desired editing operations to perform on each photograph, and (3) photograph by photograph view a display of the photo and the selections made. Performing these actions from a single screen, eliminates unnecessary steps. In representative embodiments, a user of a digital camera can easily and conveniently perform these actions by selecting and activating a desired menu listed function using only one or two thumbs while at the same time holding the camera. In the following detailed description and in the several figures of the drawings, like elements are identified with like reference numerals.

2. Discussion

In a representative embodiment, after taking a series of pictures, the user selects a "Sort" mode or screen by either selecting from choices on a dedicated mode dial or from within a view menu. This sort screen displays thumbnails of the pictures taken along the left-hand side of the color LCD screen. Across the top of the screen are icons or text representing the available operations (delete, lock, rotate, etc.). The remainder of the screen is a matrix of check boxes lining up in rows with each photo and in columns with each operation. Using 4-direction navigation and an "ok" button, the user can quickly scroll though the pictures and navigate through the matrix. To perform an operation on any one of the photos, the user simply highlights the check box associated with the desired photo and operation and "checks" it by pressing the "ok" button. Scrolling to the very top reveals an "ALL PHOTOS" picture. Checking any box in this row performs the operation on all the pictures in the camera. If the user wants to zoom in on any of the pictures to view more detail before deciding how to operate on it, he simply highlights the desired photo and presses the "ok" button. The picture is then displayed full screen. Scrolling right reveals the check boxes in the in the top right corner of the display. From here, the user can navigate through the matrix in the same way as in the zoomed out view—up/down to scroll through pictures, left/right to scroll through operations, and "ok" to select an operation.

Figure 1:
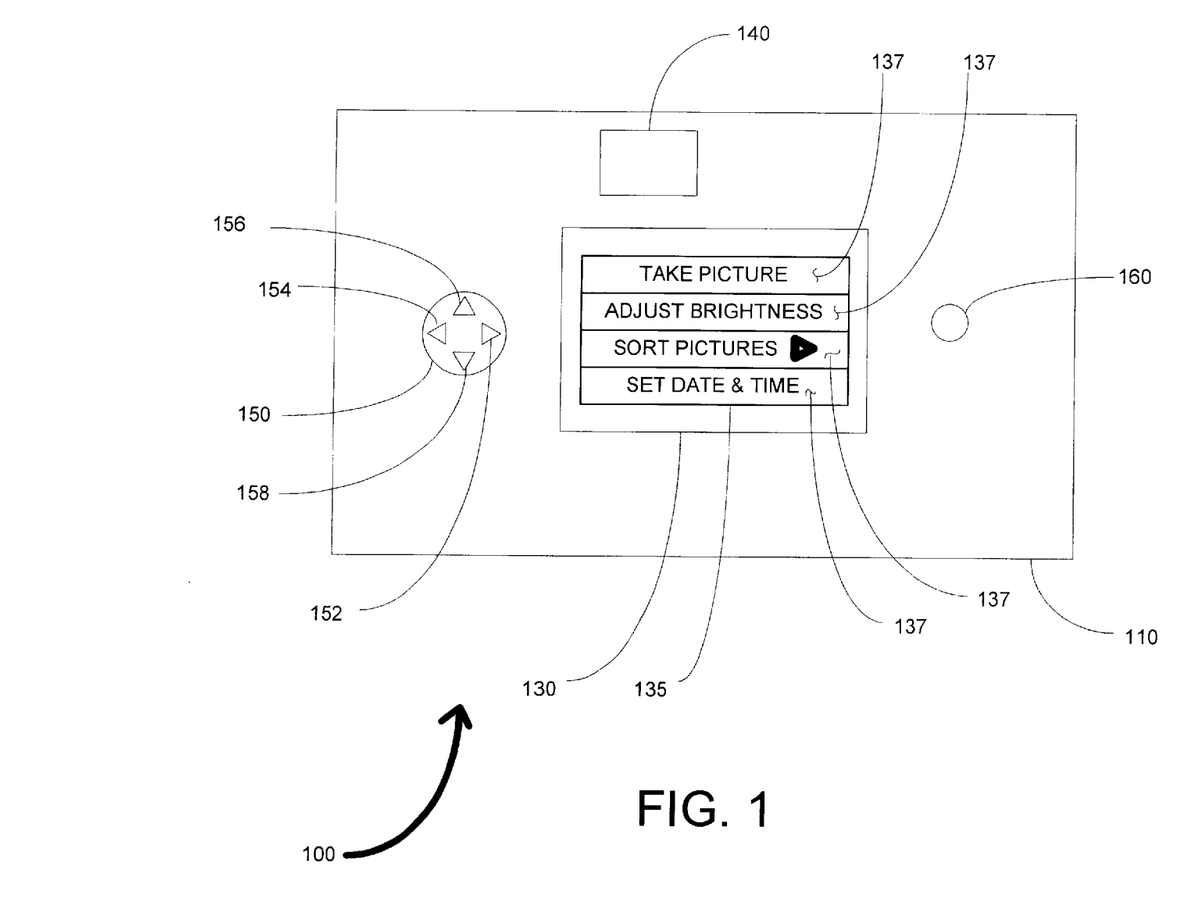
FIG. 1 is a drawing of an optical image device as described in various representative embodiments of the present patent document.

FIG. 1 is a drawing of an optical image device 100 as described in various representative embodiments of the present patent document. In representative embodiments, the optical image device 100 is an image recording device 100 such as a digital camera 100 or a digital video camera 100. The image sorting apparatus disclosed herein, however, is not limited to use with only these devices. It has general applicability to devices in which multiple images are sorted.

In the representative embodiment of FIG. 1, the digital camera 100 comprises a camera body 110, a visual display 130, an optical view finder 140, a first switch 150, and a second switch 160. The first switch 150 is a five position switch permitting navigation of various selections in a two dimensional matrix via up-down and left-right movement. The first switch 150 could be for example a four-arm rocker switch 150 having a first rocker arm 152, a second rocker arm 154, a third rocker arm 156, and a fourth rocker arm 158. The five positions of the four-arm rocker switch 150 are "off", first rocker arm 152 "on", second rocker arm 154 "on", third rocker arm 156 "on", and fourth rocker arm 158 "on". Also referred to herein but not shown in the drawings, "off" position of the first switch 150 is referred to as a first first-switch position 181, first rocker arm 152 "on" switch position is referred to as a second first-switch position 182, second rocker arm 154 "on" switch position is referred to as a third first-switch position 184, third rocker arm 156 "on" switch position is referred to as a fourth first-switch position 186, and fourth rocker arm 158 "on" switch position is referred to as a fifth first-switch position 188. The first switch 150 could also be, for example, a combination of two three-position switches, two two-arm rocker switches, four individual switches, a joystick, or other switch or combination of switches. The various positions of the first switch 150 permits navigation within the various components displayed on the visual display 130. Second switch 160 has two positions, an "off" position and a "select/deselect" position. The "select/deselect" position is also referred to herein as the "ok" position. Also referred to herein but not shown in the drawings, the "off" position of the second switch 160 is referred to as first second-switch position 191 and the "select/deselect" position of the second switch 160 is referred to as second second-switch position 192. The "select/deselect" position permits the selection and deselection of the various components displayed on the visual display 130. In another embodiment, the first switch 150 and the second switch 160 could be combined into a single switch comprising a four way switch, as for example the four-arm rocker switch, with a center "OK" button.

In representative embodiments, the visual display 130 is a liquid crystal display (LCD display) 130, a light emitting diode (LED) display 130, or a field emission display (FED) 130. However, other display technologies are also possible. The visual display 130 comprises at least one menu 135, but typically several menus 135. Each menu 135 comprises at least one function label 137, but typically several function labels.

The menu 135 of the visual display 130 of FIG. 1 presents various options described by the function labels 137 to the user. The user uses the up-down movements of the first switch 150 to present an option for possible selection. In this case the option presented by one of the function labels 137 is that of sorting the images previously stored on the camera 100 which is indicated in FIG. 1 by the right pointing triangle beside the function label 137 "SORT PICTURES" in the menu 135 of the display 130. Selection of this option is effected by pressing the second switch 160. While shown in this embodiment as a function on the digital camera 100, the sorting process could be performed on another device such as a computer.

Figure 2A:
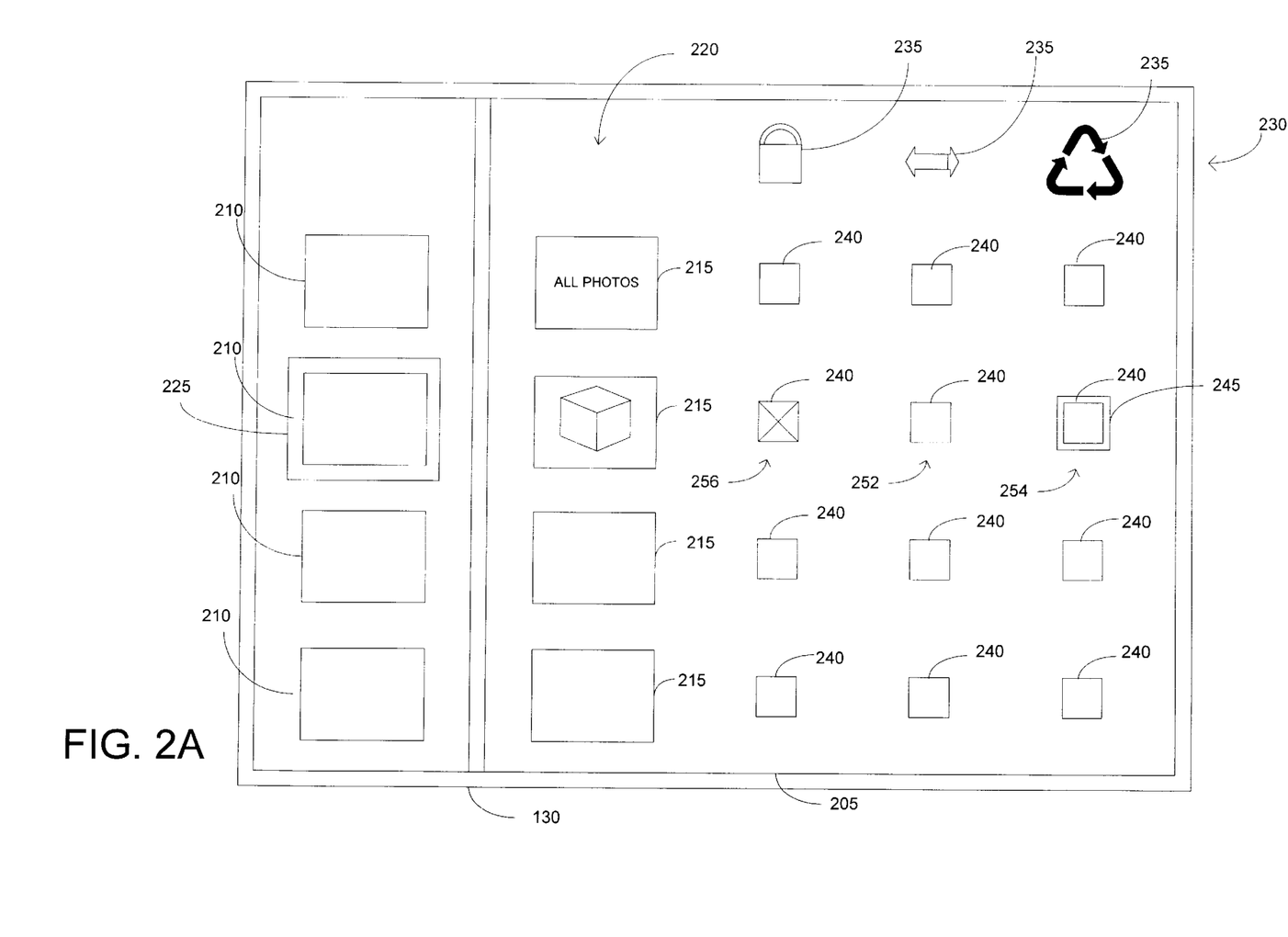
FIG. 2A is a drawing of a first screen of a visual display of the optical image device as described in various representative embodiments of the present patent document.

FIG. 2A is a drawing of a first screen 205 of the visual display 130 of the optical image device 100 as described in various representative embodiments of the present patent document. The first screen 205 is also referred to herein as the first visual-display screen 205. Various images 215 available for sorting are shown in an image column 220. More generally the images 215 are data files 215 which also could be tables 215 or a combination of images 215 and tables 215.

In an optional embodiment, various image file combinations 210, table combinations 210, or image file and table combinations 210 are shown in the far left column of the visual display 130 in FIG. 2A. The various images 215 contained in the selected image combination 210 are then shown in the image column 220. To select a particular image combination 210, the second rocker arm 154 of the first switch 150 is first actuated until one of the image combinations 210 is outlined, highlighted or otherwise indicated as special, then the third and fourth rocker arms 156,158 of the first switch 150 are actuated until the desired image combination 210 is outlined, highlighted or otherwise indicated as special. The selected image combination 210 is shown in FIG. 2A by an image combination selection indicator 225 which could be for example an outline surrounding that image combination 210. However, other selection identification techniques, as for example highlighting the selected image combination 210 are also possible. The selected image combination 210 could then be selected, for example, by actuating the second switch 160. In an alternative representation, the image combinations 210 could be camera 100 functions such as take a picture, adjust brightness level, etc.

A first row 230, also referred to herein as a function label row 230, placed horizontally across the top of the first screen 205 contains function labels 235 which could be for example icons 235 or written descriptions 235 indicating the particular sorting function, such as deleting, locking, grouping, printing, rotating, and other functions, that can be performed on the images 215. In columns under each icon 235 and in rows for each image 215 displayed on the first screen 205 is an image-function indicator 240, also referred to herein as a function indicator 240. Two dimensional navigation within the right part of the first screen 205, i.e., within the vertical columns defined by the sort selection icons 235 and with the horizontal rows defined by the images 215 is effected, for example, by pressing the rocker arms 152,154,156,158 of the first switch 150. In the representative example, the image 215 or image-function indicator 240 available for selection is outlined by a selection indicator 245 which is shown in FIG. 2A as an outline around one of the image-function indicators 240. If the function associated with the image 215 and function label 235 pair has not been selected, actuation of the second switch 160 marks that function as selected, as for example placing an "X" in the appropriated box. If the function associated with the image 215 and function label 235 pair is selected, actuation of the second switch 160 marks that function as deselected, as for example removing the "X" from the appropriated box.

The image-function indicators 240 have first, second, third, and fourth selectedfunction-display modes 252,254, 256,258 associated with them. For illustrative purposes one each of the first, second and third selected-function-display modes 252,254,256 are shown in FIG. 2A The first selected-function-display mode 252 indicates that the associated function is deselected and cannot be selected, the second selected-function-display mode 254 indicates that the associated function is deselected and can be selected, and the third selectedfunction-display mode 256 indicates that the associated function is selected and cannot be deselected. Selection and de-selection of the functions can be effected only if the imagefunction indicator 240 is available for selection which in the representative embodiment is indicated by the selection indicator 245 in FIG. 2A.

Figure 2B:
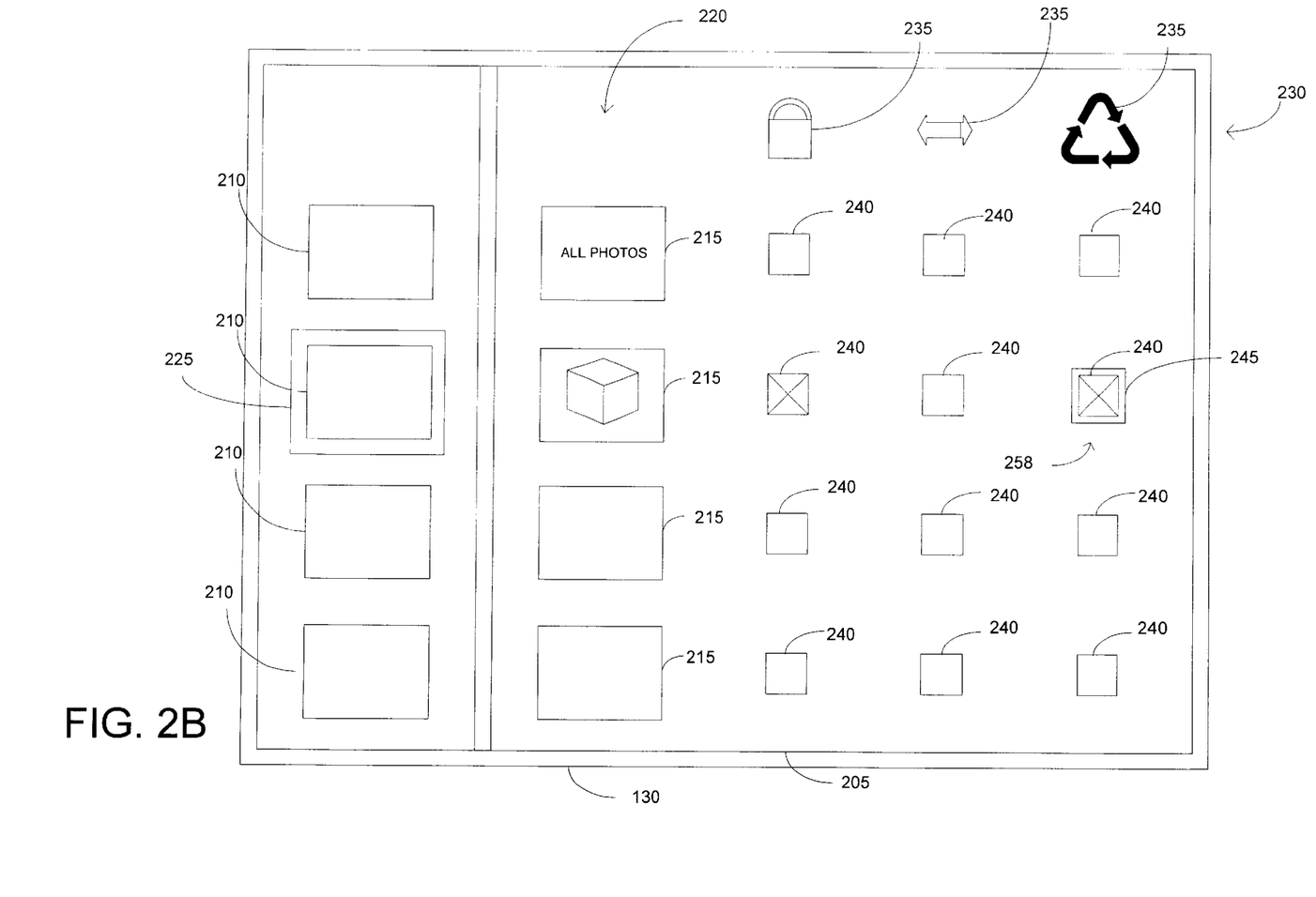
FIG. 2B is another drawing of the first screen of the visual display of the optical image device as described in various representative embodiments of the present patent document.

FIG. 2B is another drawing of the first screen 205 of the visual display 130 of the optical image device 100 as described in various representative embodiments of the present patent document. FIG. 2B shows the fourth selected-function-display mode 258 which indicates that the associated function is selected and can be deselected.

Figure 2C:
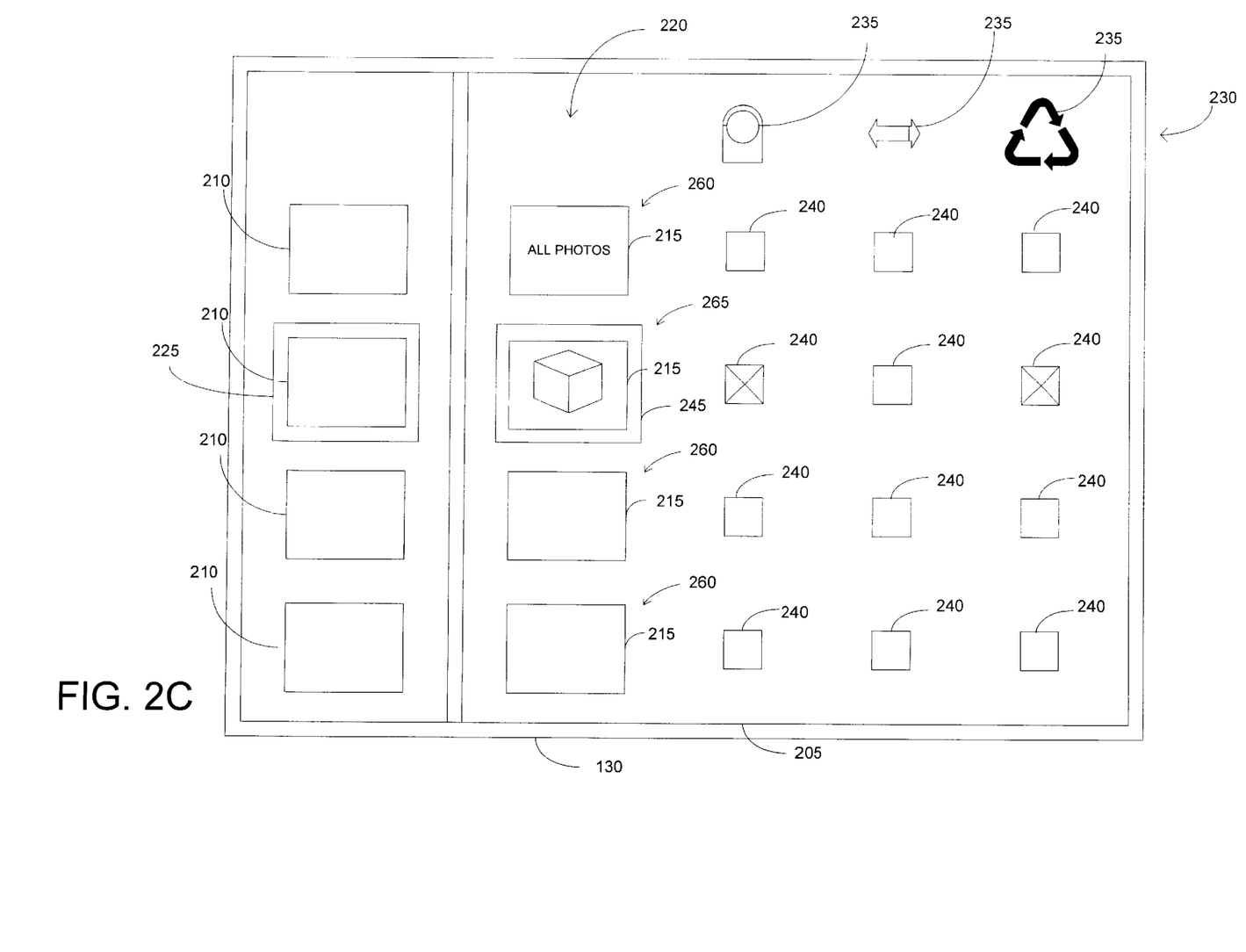
FIG. 2C is yet another drawing of the first screen of the visual display of the optical image device as described in various representative embodiments of the present patent document.
Figure 3:
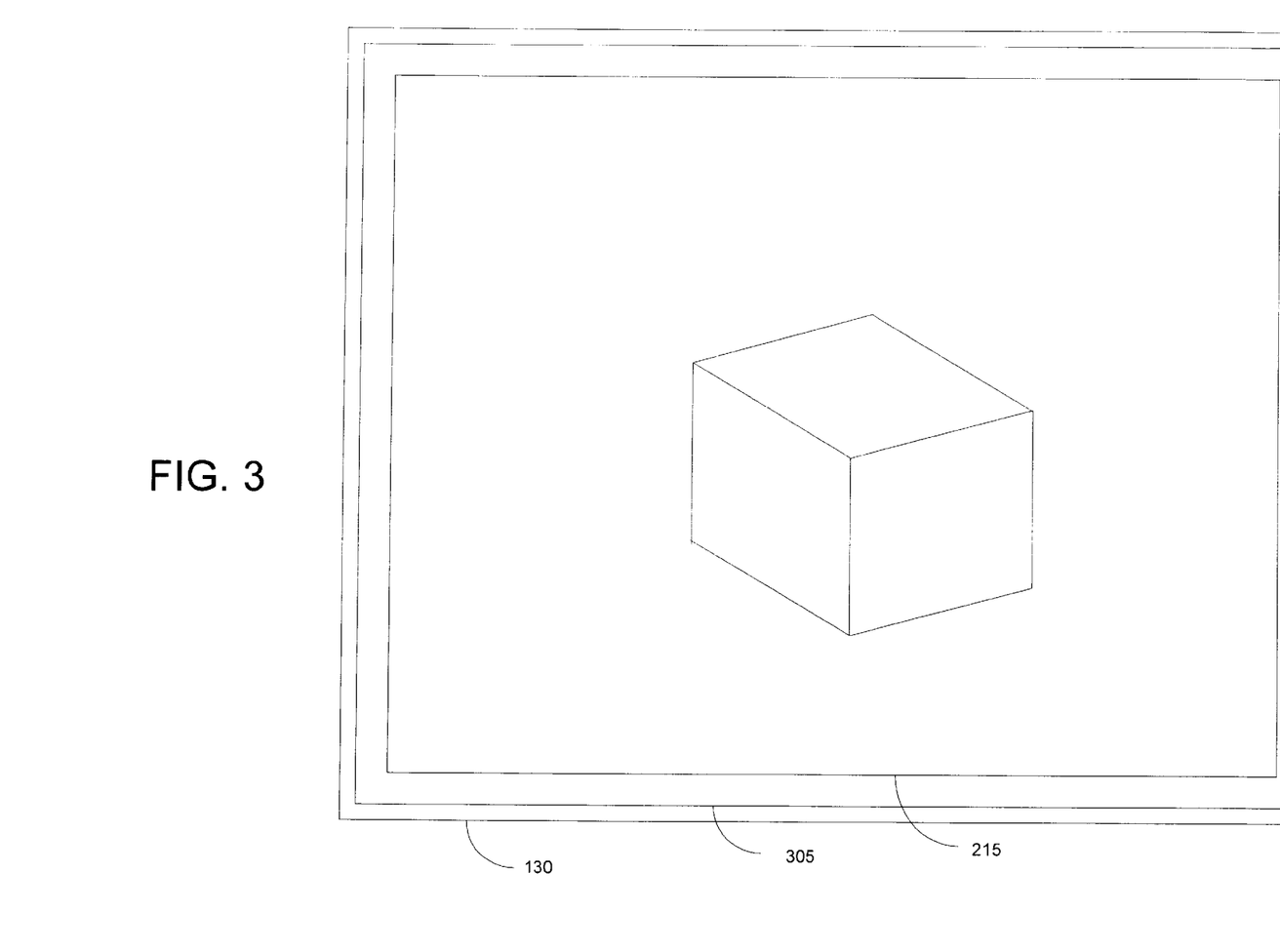
FIG. 3 is a drawing of a second screen of the visual display of the optical image device as described in various representative embodiments of the present patent document.

FIG. 2C is yet another drawing of the first screen 205 of the visual display 130 of the optical image device 100 as described in various representative embodiments of the present patent document. In FIG. 2C, images 215 are displayed in a first and second imagedisplay mode 260,265. When in the first image-display mode 260, image 215 cannot be selected. While in the second image-display mode 265, the image 215 identified by the selection indicator 245 can be selected. The image 215 identified by the selection indicator 245 is selected for alternative display by actuating the second switch 160. As shown in FIG. 3, this action displays on the visual display 130 a second screen 305 comprising the image 215 identified by the selection indicator 245.

FIG. 3 is a drawing of the second screen 305 of the visual display 130 of the optical image device 100 as described in various representative embodiments of the present patent document. FIG. 3 shows the visual display 130 with the selected image 215 expanded to substantially fill the visual display 130. Actuating the second switch 160 from the second screen 305 returns the visual display 130 to the multi-image view of the first screen 205.

Figure 4:
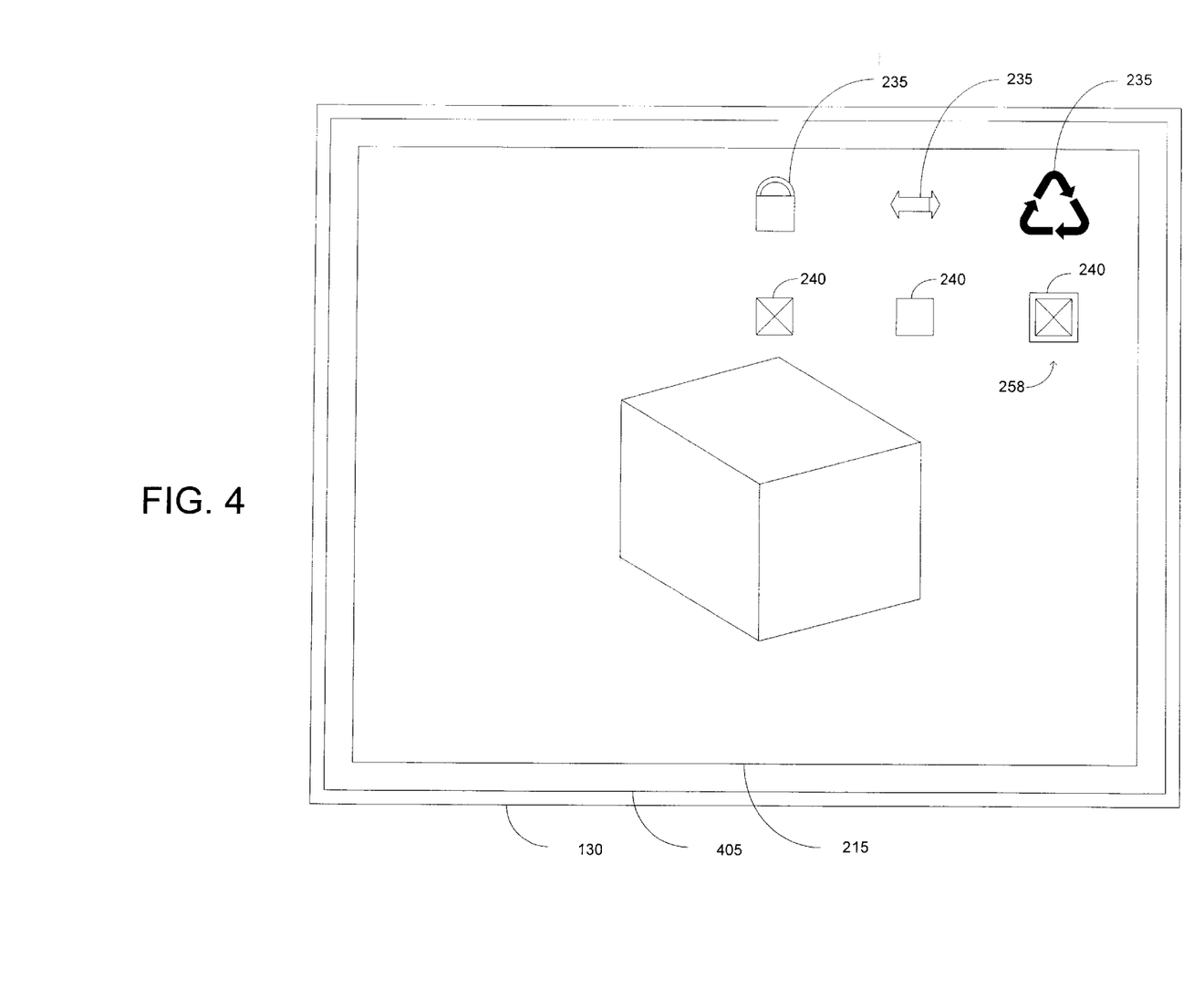
FIG. 4 is a drawing of a third screen of the visual display of the optical image device as described in various representative embodiments of the present patent document.

FIG. 4 is a drawing of a third screen 405 of the visual display 130 of the optical image device 100 as described in various representative embodiments of the present patent document. The third screen 405 is obtained from the second screen 305 by scrolling right, i.e., by actuation of the first rocker arm 152 of the first switch 150. The selected image 215 10 displayed on the second screen 305 of the visual display 130 in FIG. 3 is augmented in FIG. 4 with function labels 235 and image-function indicators 240 for that image 215. The image-function indicators 240 marked as selected in FIG. 4 are the same as those marked selected in the multi-image view of the first screen 205 shown in FIG. 2C. Actuating the second switch 160 from the third screen 405 successively selects and deselects the function associated with the image-function indicator 240. Scrolling left, i.e., actuation of the second rocker arm 154 of the first switch 150, from the third screen 405 returns the visual display 130 to the second screen 305.

In representative embodiments described above, a function indicated as selected by the associated image-function indicator 240 is initiated immediately. However, in an alternative embodiment the functions could be cued and then executed at a later time.

3. Concluding Remarks

A primary advantage of the embodiments as described in the present patent document over prior methods is that the user can view and sort images at one time from a common screen providing the user the advantages of clearly observing which images will have which operations performed on them and the user can select any combination of images and operations from a single screen, thereby eliminating unnecessary steps.

While the present invention has been described in detail in relation to representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A visual display for an optical image device, comprising:
    a first screen, comprising:
        at least two data files displayed on the visual display;
        at least one function label, wherein each function label identifies a function operable on at least one data file; and
        at least one function indicator for each paired data file and function operable on that data file, wherein each function indicator is displayable in first, second, third, and fourth selected-function-display modes, wherein the first selected-function-display mode indicates that the associated function identified by the function label is deselected and cannot be selected, wherein the second selected-function-display mode indicates that the associated function is deselected and can be selected, wherein the third selected-function-display mode indicates that the associated function is selected and cannot be deselected, and wherein the fourth selected-functiondisplay mode indicates that the associated function is selected and can be deselected.

2. The visual display as recited in claim 1, wherein the visual display is connected to the optical image device and wherein the optical image device is selected from the group consisting of a digital camera and a video camera.

3. The visual display as recited in claim 1, wherein the visual display is a display selected from the group consisting of a liquid crystal display, a light emitting diode display, and a field emission display.

4. The visual display as recited in claim 1, wherein the data files displayed are selected from a combination of data files, wherein the combination has been marked as selected on the visual display.

5. The visual display as recited in claim 1, wherein the data file is a file selected from the group consisting of an image file and a table.

6. The visual display as recited in claim 5, comprising at least one image file and at least one table.

7. The visual display as recited in claim 1, further comprising:
   a second screen, wherein the first and second screens are separately displayable on the visual display, wherein selecting the data file on the first screen replaces the first screen with the second screen, comprising:
      the selected data file displayed so as to substantially fill the visual display.

8. The visual display as recited in claim 7, further comprising:
   a third screen, wherein first, second, and third screens are separately
   displayable on the visual display, comprising:
      one selected data file displayed so as to substantially fill the visual display; and
      the function indicators paired with the displayed data files, wherein each function indicator is displayable in first, second, third, and fourth selected-function-display modes.

9. The visual display as recited in claim 7:
   wherein the first screen further comprises:
      the data files displayed in a column on the visual display and wherein the function indicators are displayed in rows for each data file displayed on the visual display; and
   further comprising:
      a first switch connected to the optical image device, wherein the first switch comprises first, second, third, fourth, and fifth first-switch positions, wherein the first first-switch position is the "off" position, and successive actuations of the second, third, fourth, and fifth first-switch positions permits two dimensional navigation of the first screen, wherein the position to which navigated on the first screen identifies the data file and function indicator associated with that position on the first screen; and
      a second switch, wherein the second switch comprises first and second second-switch positions, wherein the first second-switch position is the "off" position and wherein,
         when a given function indicator is identified, successive actuations of the second second-switch position selects and deselects the identified function associated with the function indicator; and
         when a given data file is identified, actuations of the second second-switch position replaces the first screen with a second screen wherein the second screen displays the given data file substantially full screen.

10. The visual display as recited in claim 9, wherein:
   when the second screen is displayed, actuation of the second second-switch position replaces the second screen with the first screen; and
   when the second screen is displayed, actuation of the second first-switch position replaces the second screen with a third screen, wherein first, second, and third screens are separately displayable on the visual display, comprising:
      one selected data file displayed so as to substantially fill the visual display; and
      the function indicators that are paired with the displayed data file, wherein each function indicator is displayable in first, second, third, and fourth selected-function-display modes.

11. The visual display as recited in claim 9, wherein the first switch is a switch selected from the group consisting of two three-position switches, two two-arm rocker switches, four individual switches, a joystick, and a four-arm rocker switch.

* * * * *